United States Patent Office 2,769,918
Patented Nov. 6, 1956

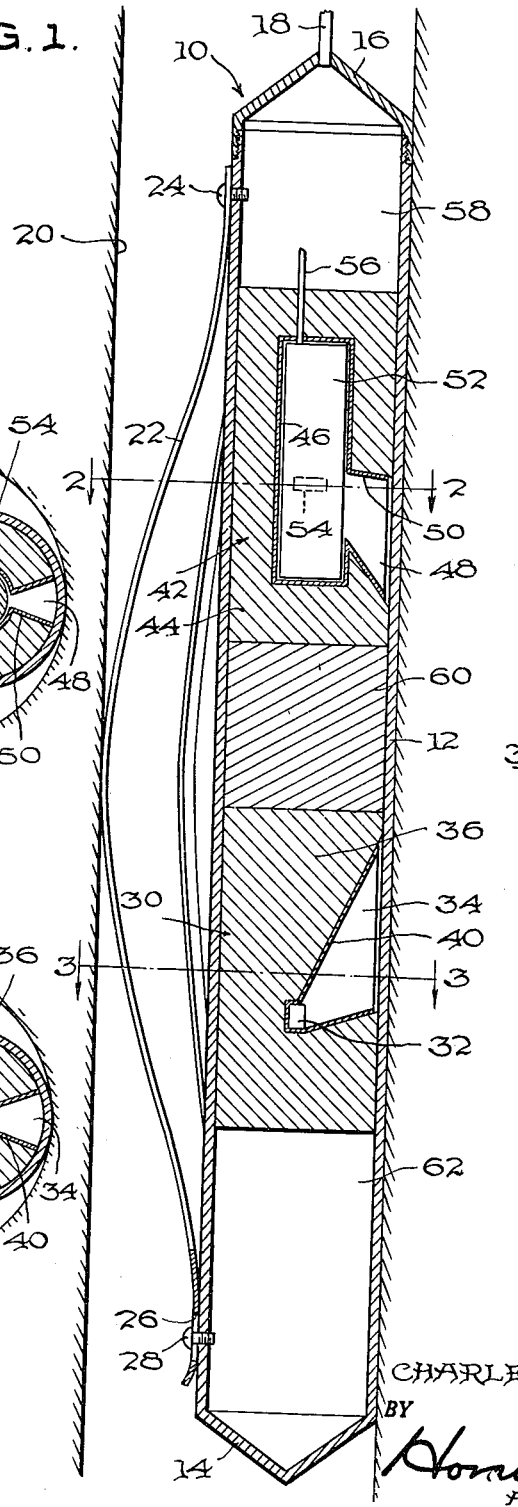
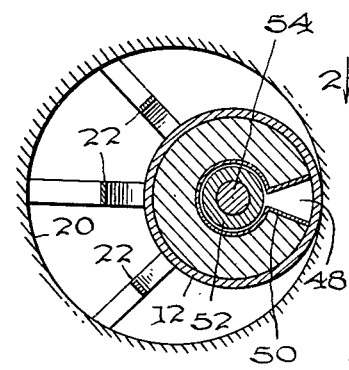
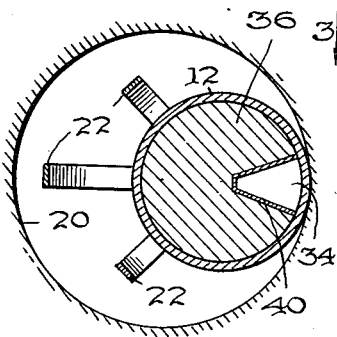

2,769,918

EPITHERMAL NEUTRON LOGGING METHOD USING COLLIMATION

Charles W. Tittle, Oakmont, Pa., assignor to Gulf Research & Development Company, Pittsburgh, Pa., a corporation of Delaware Application October 2, 1952, Serial No. 312,678

3 Claims. (Cl. 250—83.3)

This invention relates to neutron-well logging generally, and more particularly pertains to a method and apparatus for directing fast neutrons from a borehole into surrounding formations, and then detecting only those neutrons returning to the borehole epithermal energies.

Processes affecting fast neutrons within a formation to reduce the energies thereof to within what is known as the epithermal range and which are determinative of the flux distribution of such epithermal neutrons are preponderantly dependent upon the amount of hydrogen present and are relatively independent of the concentration of common non-hydrogenous elements present in the formation. By epithermal neutrons is meant neutrons possessing energies lying within the interval from about 0.2 electron volt to a few hundred electron volts, as will be understood by those skilled in the art. This is in contrast to the processes affecting thermal-neutron distribution, such distribution being influenced to a much larger degree by the presence of usual non-hydrogenous elements in the formations. In view of these considerations, it will be seen that a measurement of epithermal-neutron flux will bear a closer correlation to the amount of hydrogen present in a formation than a measurement of thermal or thermal and epithermal-neutron flux, inasmuch as hydrogen rather than non-hydrogenous substances is pre-eminently determinative of the epithermal-neutron flux. Such correlation is of importance, since knowledge of formation hydrogen content is useful in estimating formation porosity, indicating the possible presence of petroleum, etc.

Accordingly, the paramount aim of the instant invention is to afford an indication of the hydrogen contained in a formation by ascertaining the epithermal-neutron flux produced upon irradiating the same with fast neutrons.

An ancillary aim, in accordance with the above-mentioned paramount aim, is to obtain a continuous indication of epithermal-neutron flux with respect to the earth formation penetrated by the borehole.

Inasmuch as hydrogenous material, such as ordinary borehole fluid, disposed within the borehole will influence epithermal-neutron distribution in the same manner as hydrogen within the formation, and would therefore tend to mask the effects produced by the latter; it is another purpose of this invention to direct neutrons in such a manner as to avoid passage thereof through the borehole fluid.

Briefly, the instant invention comprises a casing adapted to be moved vertically in a borehole and a positioning device designed to maintain one side of the casing pressed flush against one side of the borehole wall, despite variations in borehole diameter. Vertically spaced within the casing is a source of fast neutrons and an epithermal-neutron detector, the source of neutrons being so shielded as to permit only a relatively narrow beam of neutrons to pass outwardly of the casing into surrounding formations and this only in the immediate vicinity of the area of contact between the casing and the borehole wall. The epithermal-neutron detector is so shielded as to be sensitive to only those neutrons that enter the casing from the immediate vicinity of the area of contact between the casing and the borehole wall.

Thus, fast neutrons are directed into the earth formation in such a direction as not to traverse a material amount of borehole fluid, and neutrons that are received by the neutron detector are limited to those that may pass thereto from the formation without traversing a material amount of borehole fluid. Since a neuron detector is employed that responds to only those neutrons of epithermal energies, the response thus obtained bears the desired correlation to the hydrogen contained in the formation.

A full comprehension of the invention will be obtained from the following detailed description taken in conjunction with the accompanying drawings, wherein:

Figure 1 illustrates the invention in central vertical section and shows the same operatively disposed in a borehole with the neutron detector being shown diagrammatically and the position of its sensitive elements indicated in dotted outline; and Figures 2 and 3 are, respectively, horizontal sectional views taken upon the section lines 2—2 and 3—3 in Figure 1.

The logging apparatus is designated generally at 10 and comprises a hollow casing 12 of substantially neutron-transparent material, such as steel or aluminum, such casing being provided with a conical closure wall 14 at its lower end and a conical cap structure 16 detachably threaded upon its upper end, as shown. A cable 18 is suitably secured to the cap structure 16, whereby the casing 12 may be raised and lowered in the borehole 20 by conventional operating equipment, not shown, at the surface of the ground, such cable 18 being of a known type incorporating electrical leads.

A positioning device is provided for maintaining one side of the casing 12 pressed flush against one side of the borehole wall 20, as shown, and takes the form of a plurality of spaced arcuate steel spring strips 22 disposed about a portion of the periphery of the casing 12 with each having its upper end securely fastened to the casing 12 by a headed bolt 24 threaded into the casing 12. Each spring strip 22 is provided with a longitudinally extending slot 26 adjacent its lower end, and is secured to the casing 12 by means of a headed bolt 28 that extends through the slot 26 and is threaded into the casing 12. The shank portion of the bolt 28 is slidable within the slot 26, and the arrangement is such that the spring strips 22 yieldingly urge the opposite side of the casing 12 into engagement with the borehole wall 20. The flexibility of the spring strips 22, and the lost motion connection between their lower end portions and the casing 12, maintain the casing 12 in contact with the borehole wall despite variations in borehole diameter. The arcuate shape of the spring strips 22 and the conically-shaped ends of the casing 12 prevent the casing 12 from lodging against obstructions that may protrude into the borehole 20.

Indicated generally at 30 is an assemblage constituting a source of neutrons and means for collimating the same, the same comprising a source of fast neutrons 32, such as radium-beryllium or polonium-beryllium, disposed at the inner end of a relatively narrow collimating slot or opening 34 formed in a cylindrical neutron shield 36 fitted in the casing 12.

The slot 34 is divergent in the vertical plane and is inclined upwardly and outwardly from its inner end, and has its outer end disposed at the side of the casing 12 diametrically opposed to the spring strips 22, so that neutrons emanating from the source 32 and passing through the slot 34 into the earth formation 38 will pass through such portion of the casing 12 as is substantially flush with the side of the borehole wall 20.

The neutron shield 36 is for the purpose of moderating and absorbing neutrons passing from the source 32 thereinto, and for this purpose a neutron moderator, such as paraffin, graphite or beryllium oxide may be employed in which there is incorporated a material having a high neutron-absorption cross section, such as compounds of cadmium, boron, lithium, etc. For example, the shield 36 may comprise a mixture of paraffin and boric acid. Alternatively, the shield 36, rather than being a mixture of a moderator and absorber, may comprise a moderator of the type mentioned above surrounded by an absorber, such as cadmium, indium, or europium.

In order to prevent neutrons from passing from within the shield 36 into the slot 34 and to afford better neutron collimation generally, the slot 34 is lined with a neutron absorber 40, such as cadmium, indium, or europium.

It will thus be seen that a large fraction of the neutrons emanating from the assemblage 30 will be in a stream passing from the slot 34, which stream in the plane transverse to the direction thereof will be of considerable vertical extent and smaller horizontal extent, and which passes substantially directly into the formation 38 upon passing through the casing 12.

Indicated generally at 42 is an assemblage constituting an epithermal-neutron detector and shielding means limiting access of neutrons thereto except from a limited angular direction. Such assemblage 42 comprises a cylindrical mass of neutron-moderating material 44, fitted in the casing 12, material 44 being such as paraffin, graphite, or beryllium oxide in which there is formed a central cavity 46 that has communication with the exterior of the material 44 through a collimating slot or opening 48.

The cavity 46 and the slot 48 are lined with an absorber of both epithermal and thermal neutrons 50, such an indium or europium. Disposed within the cavity 46 and its lining 50 is an epithermal-neutron detector illustrated diagrammatically at 52, such neutron detector including a neutron-sensitive element situated at the position indicated in dotted outline at 54, which it will be noted is in alignment with the slot 48.

The epithermal neutron detector 52 is of a type substantially insensitive to thermal neutrons and fast neutrons, and is responsive to neutrons in the intermediate energy range ordinarily referred to as epithermal. While any epithermal-neutron detector possessing the stated requisite will suffice for the purposes of this invention, the invention preferably utilizes a detector of the type disclosed in my copending and coassigned application entitled Epithermal Neutron Detector, Serial No. 312,680 filed of even date, or my copending and coassigned application entitled Coincidence-Type Slow Neutron Detector, Serial No. 312,679 filed of even date.

The collimating slot 48 is generally similar to the previously-described collimation slot 34, and is convergent in the vertical plane inwardly towards the detector 52. The collimation slot 48, like slot 34, is relatively narrow and permits only those neutrons passing substantially directly from the formation 38 into the casing 12 through the area diametrically opposed to the spring strips 22 to enter the detector 52.

An electrical conduit 56 is provided for establishing necessary electrical connections with the detector 52, such conduit extending into the space 58 within the casing 12 overlying the shielding material 44. Although not shown, associated electrical equipment that may be deemed necessary, such as amplifiers, discriminators, scaling and counting circuits, or recording apparatus may be disposed within the space 58, if desired, in which event appropriate connections thereto by the detector would be made by the conduit 56, and with such equipment being supplied electrical energy and possibly vertical-position signals through electrical leads in the cable 18, as will be understood. Other contemplated alternative arrangements include direct electrical coupling of the conduit 56 to the electrical leads within the cable 18, with associated recording apparatus, etc., being situated at the earth's surface; or positioning only a portion of associated electrical equipment within the space 58, such as amplifiers, with the remainder of such associated equipment being situated at the earth's surface.

Although not deemed essential to successful operation of the invention, the preferred embodiment includes a cylindrical mass of gamma-ray shielding material 60 disposed in the casing 12 intermediate the assemblages 30 and 42, such shielding material 60 being for the purpose of preventing direct gamma-ray transmission from the assemblage 30 to the detector 52. It will be evident that the desirability of providing shielding material 60 may be obviated to a large extent where the detector 52 employed is substantially insensitive to extraneous gamma radiation, as in the case of the epithermal-neutron detectors disclosed in my above-mentioned copending applications, inasmuch as such detectors incorporate gamma-ray shielding in themselves. Even if a detector 52 is employed that is sensitive to extraneous gamma radiation, it will be clear that shielding material 60 is not essential where the assemblage 30 is of such a character that it does not produce a significant amount of gamma radiation.

A variety of good gamma-ray shielding materials are known and may be utilized as shielding material 60, such as lead, bismuth, tungsten, or high tungsten alloys.

The space 62 in the casing 12 is shown as unoccupied; however, the same may be utilized by filling the same with heavy ballast, not shown, or as storage space for auxiliary electrical apparatus that it may be found expedient to associate with the detector 52. On the other hand, if no use for the existence of space 62 is present, the over-all length of the casing 12 and the spring strips 22 may be so shortened in their lower portions that the material 36 entirely fills the lower portion of the casing 12.

No specific means has been illustrated for supporting the assemblages 30 and 42 and the shielding material 60 within the casing, as such a showing is not deemed necessary as not forming a part of the invention. Any suitable mechanical means may be provided for retaining such components in their proper positions relative to the casing 12, such as fasteners carried by the casing 12 and engaging the components therein.

The operation of the apparatus 10 will be readily understood in the light of the preceding description. The apparatus 10 is moved vertically within the borehole 20 by the cable 18 with the spring strips 22 maintaining one side of the casing 12 pressed against the borehole wall 20 to exclude borehole fluid from therebetween for a portion of the periphery of the casing 12. The assemblage 30 directs a narrow, fan-shaped stream of fast neutrons upwardly and into the earth formation 38 through the peripheral portion of the casing 12 pressed against the borehole wall 20.

The fast neutrons, upon entering the formation 38, are subjected to an interaction with the elements making up the formation 38, and only such of the neutrons that diffuse back into the borehole 20 and in alignment with the slot 48 are detected that possess epithermal energies, as distinguished from fast and thermal neutrons, and with the further limitation, imposed by the assemblage 42 construction, that only such neutrons that pass through the peripheral portion of the casing 12 substantially in contact with the borehole wall 20 are measured.

The collimation of neutrons from the source 32 and the collimation of neutrons to the detector 52 cooperates with the spring strips 22 substantially to confine the method to the treatment of and the detection of neutrons that have not traversed a material quantity of borehole fluid.

Inasmuch as only epithermal neutrons produced by the interaction of fast neutrons with the formation 38 are detected, and since such interaction to produce epithermal neutrons is primarily a distinctive function of hydrogen nuclei present in the formation 38, such detection is empirically closely related to hydrogen concentration in the formation 38 in the zone immediately adjacent the apparatus 10, and therefore affords information upon which an intelligent and valuable appraisal of the character of the formation 38 may be made.

As in conventional logging apparatus, the data supplied by apparatus 10 is correlated by conventional means, not shown, for the reason of not per se constituting the subject matter of the invention, with the vertical position of the apparatus 10. The final result is a data correlation between vertical position and epithermal-neutron flux detected, such as a graph with epithermal-neutron flux plotted as ordinates upon a vertical-position abscissa.

By the disclosed method and with the apparatus disclosed for the practice thereof, the continuous sequence of epithermal-neutron flux data may be obtained as the apparatus 10 is progressively moved along the borehole 20, whereby a log may be expeditiously obtained. Assuming that a given apparatus 10 has been used to obtain a log of a borehole passing through formations of known hydrogen concentration character for what may be termed calibration purposes, a log of a borehole passing through unknown formations may be readily interpreted as to hydrogen concentration by reference to the calibration log.

It is to be noted that the adaptability of the positioning device (spring strips 22) to variations in borehole diameter permits a given apparatus 10 to be utilized in various boreholes of substantially different size. Furthermore, the apparatus 10 may be used in uncased as well as cased boreholes. In the latter connection, it is to be noted that reliable data may be secured where the borehole is cased with steel pipe, inasmuch as such pipe is substantially non-hydrogenous.

While apparatus incorporating radioactive materials inherently present health hazards, it is submitted that the collimation utilized in the invention materially reduces such hazards by permitting operating personnel to maintain an orientation of the apparatus 10 to direct the intense field of radiation away from themselves.

It will be appreciated by those skilled in the art that conventional neutron detectors other than the preferred selective epithermal neutron detector 52 may be utilized in lieu thereof, such as a boron fluoride filled proportional counter tube so as to detect a wide neutron energy spectrum, without losing many of the advantages of the invention, such as substantially avoiding the effects of borehole fluid, etc. A selective epithermal detector is preferred for the truer hydrogen concentration indication thereby obtained, as previously explained.

The above described application of a neutron collimating technique to well logging will, of course, admit many variations in the particular shapes of collimation slots utilized and their relation to each other. It should be pointed out that the optimum solid angles to be defined by the collimation slots for any given apparatus will be dependent upon a number of factors, among which may be mentioned the nature and strength of the neutron source, the type of moderating and absorbing materials used in the collimators, the separation of the source and the detector, the diameter of the casing of the apparatus, and the velocity at which it is desired to move the apparatus through the borehole. For example, either a high logging speed or the use of a relatively weak neutron source would indicate the use of collimation slots that are shaped to define relatively large solid angles.

Preferably, as will be evident upon inspection of Figure 1, the general axes of the collimation slots are inclined with respect to each other in such a manner as to intersect in the earth formation at a position spaced from the borehole.

From the foregoing, the method as well as a preferred form of apparatus for practicing such method will be fully understood. It is not desired to be limited to the precise details of the described method and apparatus, inasmuch as numerous modifications of both method and apparatus will readily occur to those skilled in the art after perusal of the foregoing, and, accordingly, reference should be made to the appended claims for ascertaining the actual scope of the invention.

I claim:

1. In neutron borehole logging apparatus, a casing, a neutron source and a neutron detector axially spaced in such casing, said neutron detector being sensitive substantially solely to neutrons having energies of about 0.2 to about 200 electron volts, neutron-collimating means for directing neutrons emanating from said source through one side of the casing, and further neutron-collimating means for directing solely those neutrons entering the casing through said one side thereof to the neutron detector.

2. In the art of borehole logging, the steps of collimating fast neutrons into a stream and directing such stream of neutrons into a portion of earth formations to be logged, collimating epithermal neutrons diffusing outwardly from such portion of earth formation into a second neutron stream, and detecting substantially solely epithermal neutrons, as distinguished from fast and thermal neutrons, present in said second neutron stream.

3. The combination of claim 1 wherein said neutron detector comprises a neutron-gamma reactive material that includes nuclei of an element having a resonance peak for such reaction with neutrons of epithermal energy selected from the group consisting of indium, silver, rhodium and gold, a gamma-ray responsive scintillation phosphor adjacent said material, a photomultiplier tube optically coupled to the phosphor and a gamma-ray shield surrounding the material, the phosphor and the photomultiplier tube to attenuate background gamma-rays.

References Cited in the file of this patent

UNITED STATES PATENTS

| | | |
|---|---|---|
| 2,220,509 | Brons | Nov. 5, 1940 |
| 2,308,361 | Fearon | Jan. 12, 1943 |
| 2,322,634 | Howell et al. | June 22, 1943 |
| 2,369,672 | Hare | Feb. 20, 1945 |
| 2,508,772 | Pontecorvo | May 23, 1950 |
| 2,648,776 | Silverman et al. | Aug. 11, 1953 |

OTHER REFERENCES

Radioactivity and Nuclear Physics, Cork, 1950, 2nd edition, publ. by Van Nostrand Co. Inc., New York, N. Y., page 121.